United States Patent [19]

Jones

[11] 4,431,126
[45] Feb. 14, 1984

[54] SPRING ACTUATED CAM RETRACTOR

[75] Inventor: Robert F. Jones, Westfield Center, Ohio

[73] Assignee: The B. F. Goodrich Company, Akron, Ohio

[21] Appl. No.: 273,539

[22] Filed: Jun. 15, 1981

[51] Int. Cl.$^3$ .................. B29H 17/02; B65H 17/22
[52] U.S. Cl. ......................... 226/121; 83/252; 156/405.1; 156/406; 226/143; 242/129.1
[58] Field of Search ................ 156/406, 396, 405.1; 226/121, 143, 11; 242/129.1, 129.2, 129.3, 129.4, 56 R, 107; 225/10, 11, 12, 13, 14, 15; 83/614, 250, 252

[56] References Cited

U.S. PATENT DOCUMENTS

| | | | |
|---|---|---|---|
| 454,784 | 6/1891 | Walters | 242/129.3 |
| 2,306,501 | 12/1942 | Rouan et al. | 226/143 |
| 2,332,152 | 10/1943 | Knauer | 226/143 |
| 2,658,691 | 11/1953 | Mallory | 242/64 |
| 3,216,879 | 11/1965 | Mallory et al. | 156/406 |
| 3,230,132 | 1/1966 | Mallory et al. | 156/406 |
| 3,429,490 | 2/1969 | Cantarutti | 83/614 X |
| 3,551,252 | 12/1970 | Bishop et al. | 156/406 |
| 3,556,901 | 1/1971 | Tearne | 242/64 X |
| 3,600,252 | 8/1971 | Henley et al. | 156/406 |
| 3,795,563 | 3/1974 | Enders et al. | 156/406 |

Primary Examiner—Stuart S. Levy
Assistant Examiner—Scott J. Haugland
Attorney, Agent, or Firm—Alfred D. Lobo; Michael J. Colitz, Jr.; Joseph A. Powell

[57] ABSTRACT

When feed stock is pulled from storage and a portion cut off for use by an operator, such as a builder of tires, the remaining portion of feed stock not used by the operator for the tire he is building ("unused stock"), interferes with the tire building process. Therefore, the tire builder must take the time, and make the additional effort to move the unused stock out of his way, usually by pulling the end of the unused stock into a retaining clip on the tray of the 'servicer' which presents appropriate stocks to the tire builder. To avoid the inconvenience to the tire builder who must move the unused stock out of his way, and to save the time required for him to do so, a spring actuated cam roller is used to release the feed stock to the tire building machine when the operator pulls on the stock. After the operator cuts off a predetermined portion, a controlled reverse rotation of the cam is automatically spring actuated so as to retract the end of the unused stock and keep it out of the operator's way. The distance the end of unused stock is retracted is adjustable.

7 Claims, 3 Drawing Figures

U.S. Patent    Feb. 14, 1984    4,431,126
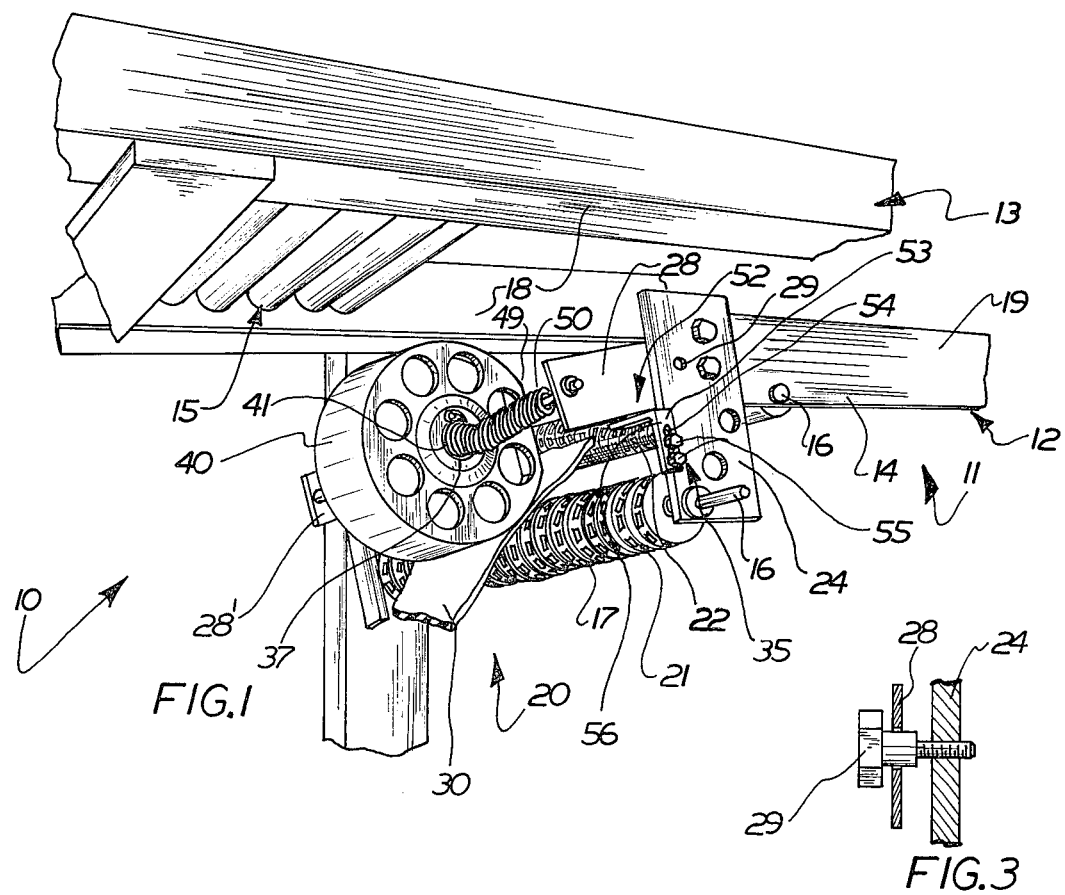

SPRING ACTUATED CAM RETRACTOR

BACKGROUND OF THE INVENTION

This invention relates to a device for presenting and subsequently, automatically retracting feed stock of arbitrary length from a 'servicer' which allows the stock to be fed (hence referred to as 'feed stock') when it is manually pulled; and, to a method of removing a predetermined length of such feed stock from storage, such as in a bale or roll thereof, by manually pulling upon the stock, cutting off a predetermined portion of feed stock to obtain a cut portion for use, and retracting the remaining unused portion of feed stock (referred to herein as "unused stock" for brevity). When retracted, the unused stock is out of the immediate zone of tire building operations and does not interfere with subsequent operations using the cut portion. The device of this invention is simple, rugged, and compact enough to be located on or under a dispensing means for stored feed stock of any cross section which presents a surface which may be frictionally engaged between roller surfaces so that the stock will 'follow' a roller surface in contact with it, essentially without slipping.

In the building of tires, predetermined lengths of uncured tire building component stocks are cut and the cut portions used as breaker plies (also referred to as "breakers" or "belts") incorporated in the crown area of a tire, whether radial ply, bias ply, or other ply configuration, a two stage process. During the first stage of building, a cylindrical carcass is formed having (a) one or more rubber covered cord plies wound around and interconnecting axially spaced, parallel, coaxial, bead cores, and (b) a layer of rubber sidewall stock on each sidewall of the carcass intermediate the eventual crown area thereof and the two bead areas thereof. Such a carcass is referred to as a "first stage carcass". During the second stage of building, the shape of the first stage carcass is changed from a cylinder to a toroid and one or more rubber covered cord belts ("belts" for brevity) and a rubber tread are added to the crown portion of the carcass to form what is referred to herein as a "green tire". The belts and the rubber tread are each manually pulled from, and then a desired length is cut from a roll of appropriate feed stock for use in building a green tire.

The device of this invention is a spring actuated cam retractor which is particularly useful in conjunction with any generally laminar feed stock a portion of which must be cut for use. The spring actuated cam retractor is still more particularly adapted for use with the servicer of a tire building machine, in conjunction with a feed tray thereof. Such tire servicers are well known and described in U.S. Pat. Nos. 2,658,691; 3,216,879; 3,230,132; 3,429,490; 3,556,901; 3,551,252; 3,600,252; and 3,795,563 inter alia. The method of removing stock with subsequent automatic retraction of the unused stock, saves the time and energy an operator normally expends to manually position the unused stock out of his way.

SUMMARY OF THE INVENTION

A simple and effective method has been discovered to operate a novel apparatus for presenting a feed stock of arbitrary length to an operator who manually pulls upon it and then cuts off a predetermined portion for use, as for example, in the building of "green" tires on a tire building machine serviced by a 'tire servicer'.

It is therefore a general object of this invention to provide an apparatus to release feed stock, and particularly a generally laminar feed stock to an operator who pulls it forward on its feed tray intending to cut off a portion of it, and then, automatically to retract the end of the remaining unused stock, so it does not interfere with subsequent operations of the operator.

It is also a general object of this invention to provide a method for removing a predetermined length of feed stock, and particularly laminar feed stock, by manually pulling upon the stock, cutting off a predetermined portion of it to obtain a cut portion for use, automatically retracting the unused portion, and positioning it in a preselected position on the tray of the servicer from which the unused portion is again presented without obstructing the subsequent operations of the operator during his tire building operation.

It is a specific object of this invention to provide an apparatus for presenting a laminar feed stock to an operator who manually pulls upon it and having cut off a predetermined portion ('cut portion') thereof removes the cut portion, and, for retracting the remaining end portion of unused stock, comprising in operable combination, (a) bi-directional roller means upon which said laminar feed stock rests, and upon which said feed stock is longitudinally translatable in either direction, (b) cam roller means having (i) a circumference corresponding to a maximum distance through which said remaining end is to be withdrawn, and (ii) a flat chordal portion having a self-setting forward edge which rests against said feed stock as it is pulled forward, (c) a cam shaft upon which said cam roller is rotatably disposed, (d) pivot arm means interconnected by said cam shaft, said pivot arm means being pivotably adjustable so as to provide a preselected loading on said feed stock between said cam roller and said bi-directional roller means, and, (e) torque exerting means to bias said cam roller when said feed stock is pulled forward, so that upon release of said remaining end portion, it is retracted through a predetermined distance corresponding to a preselected portion of said cam roller's circumference.

BRIEF DESCRIPTION OF THE DRAWINGS

The foregoing and other objects and advantages of my invention will appear more fully from the following description, made in connection with the accompanying drawings, of a preferred embodiment of the invention, wherein the reference characters refer to the same or similar parts throughout the several views, and in which:

FIG. 1 is a front perspective view from a slightly lowered elevation, showing the main components of the apparatus of this invention including particularly the cam roller and biasing means to bias the cam roller so that upon clockwise rotation, it effects retraction of the unused stock, and also showing a portion of the frame including portions of vertically stacked trays of a 'tire servicer' assembly such as is conventionally used to present uncured tire components required to build a 'green' tire on a tire carcass.

FIG. 2 is a rear perspective view from a slightly lowered elevation, showing the main components including an adjustable set collar means for adjusting the distance through which the end of the unused stock is to be retracted.

FIG. 3 is a detailed perspective view, with portions broken away, of a pivot on which one arm carrying the cam roller is pivotably disposed. The other arm carrying the cam roller is similarly pivotably disposed, opposite the one illustrated.

DETAILED DESCRIPTION OF PREFERRED EMBODIMENTS

This invention is of specific use in a 'tire servicer' such as is conventionally used to present necessary feed stocks such as belts and tire tread to an operator ('tire builder') who builds a 'green tire' on a tire carcass mounted in a tire building machine. Predetermined lengths of feed stock are cut off either manually or mechanically (non-manually) to obtain cut portions for use in building the tire. The following description is with respect to a specific embodiment, namely one in which individual portions of tire belt feed stocks (hereafter 'belt stock'), liner feed stocks, and the like, are manually cut off by the tire builder who would like to have the remaining portion of unused feed stock ('unused stock') retracted automatically so that it is not an obstruction in the zone of any of his immediately subsequent operations.

Referring to FIG. 1 of the drawing there is shown a tire servicer, indicated generally by reference numeral 10, having a frame 11 which supports one or more servicer 'trays' used to present belt feed stocks (hence 'belt trays') to the tire builder. In the particular embodiment illustrated, portions of two trays indicated generally by reference numerals 12 and 13, are shown. These trays, and an uppermost tread tray (not shown) are stacked, that is, they are disposed in spaced apart generally vertical relationship. An additional bottom tray may be provided for a liner stock.

Lower belt tray 12 and upper belt tray 13 are similar but each is used for a separate belt stock. For convenience and ease of construction, the cam retractor, indicated generally by reference numeral 20, is used in combination with lower belt tray 12, by placing it near the far end (further from the tire builder) of the tray 12 and slightly below the 'feeding' or upper surface 19 of the tray. But with upper belt tray 13, another cam retractor (not shown) is placed near its far end but slightly above the upper surface of the belt tray 13.

Lower belt tray 12 has spaced apart parallel side plates or 'side rails' 14 and 14' bounding the feeding surface 19 on which a feed stock is substantially linearly translatable with little friction. Conventionally, the side rails are interconnected with freely rotatable feed roller means, indicated generally by reference numeral 15. Typically, the roller means include a set of plural coplanarly disposed parallel roller shafts 16 on each of which shafts a multiplicity of bi-directional rollers 17 are rotatably disposed. The particular 'low-friction' feed means is not critical it being only required that belt stock 30 be movable in the forward or rearward directions on the tray with very little resistance. By 'very little resistance', and 'low-friction' is meant that a light pull by the tire builder exerting a pulling force in the range from about 1 to 5 pounds, should translate the belt along the feeding surface of the tray. The stock moves in the forward direction (toward the right, as we view FIG. 1) when the stock is pulled by the tire builder who seeks to cut the belt stock and use a cut portion; the stock moves in the rearward direction (toward the left) when the feed stock is automatically, that is non-manually, retracted as will be explained hereinafter.

Bi-directional rollers are used because belt stocks typically have reinforcing steel or synthetic resinous cords at an angle to the longitudinal direction of travel of the belt which would travel non-linearly, that is, 'wander' to one side or the other of the tray if monodirectional rollers were used. Alternatively, multi-directional rollers may be used. As is so well known as to require no specific illustration, a bi-directional roller such as is available from Kornylak Corp., comprises a disc-shaped roller having an axial bore through which a shaft may be inserted so that the disc-shaped roller is rotatable about the longitudinal axis of the shaft. On the circumference of the disc-shaped roller are spaced apart generally cylindrical rollers rotatable about an axis at right angles to the axis of the shaft, and in use, the belt stock contacts only the surfaces of these cylindrical rollers. As is also so well known as to require no specific illustration, a multi-directional roller typically comprises a sphere held in a cavity in which the sphere is freely rotatable about any of its axes.

Belt tray 12 is similarly equipped as is belt tray 13 with roller means including sets of bi-directional feed rollers 17 freely rotatable about roller shafts 16 held between side rails 18 and 18' over which rollers another belt stock is translatable to and fro longitudinally along the belt tray 13.

In addition to the feed roller means 15, belt tray 12 is provided near its far end with a primary set 21 and secondary set 22 respectively, of bi-directional rollers to guide the belt stock 30 onto the feeding surface 19. Secondary set 22 of the bi-directional rollers is mounted on a roller shaft (not shown) fixedly disposed between guide rails 14 and 14'. Primary set 21 of the bi-directional cam rollers is mounted on a roller shaft 23 which is fixedly disposed in an end plate 24 affixed near the end of the tray on side rail 14. The feed roller means 15, together with the primary and secondary sets of roller means, provide the feeding surface which has a primary end and a discharge end. The primary and secondary sets of feed roller means are referred to the primary end of the feeding surface. The particular structural features of the feeding surface are not critical, nor are those of the primary and secondary sets of feed roller means as long as the belt stock is conveniently translatable on the feeding surface, and the cam roller can coact with the primary or secondary sets of feeding surface means to make the belt stock 'follow' the cam roller's surface.

The surfaces of the primary set 21 of bi-directional rollers, along with the cam retractor 20, frictionally engage the belt stock 30, on either side of it. Another end plate 24', similar to end plate 24, is affixed on end rail 14', opposite end plate 24, as can be seen in FIG. 2, and the cam roller shaft 23 interconnects the end plates and supports the bi-directional rollers for rotation as the belt stock frictionally contacts the surfaces of the rollers.

Each of a pair of pivot arms 28 and 28' is pivotably disposed on side rails 14 and 14' for swingable movement together about pivots, one of which, pivot 29, is shown in the detailed illustration FIG. 3. The arms preferably rest on separate stops attached to the end flanges, but it is essential that at least one vertically adjustable stop 35 (as shown in FIG. 1) be provided so as to allow the distance from the arm 28 (and thus, the surface of the cam roller) to the cam roller shaft 23 to be adjusted, as will be explained herebelow.

A cam shaft 36 interconnects the pivot arms 23 and 23' and is fixedly held therebetween. Cam roller 40 having an axial bore 41 is rotatably disposed on the cam shaft 36, preferably with a bearing 38 fitted in the axial bore. A set collar 43 is tightly held against cam shaft 36 with a set screw 44 which protrudes radially outwards and acts as a stop against which cam roller pin 45 on the cam roller 40, comes to rest. The set screw 44 may be positioned at any desired radial location on the cam shaft 36 so as to adjust the distance through which the end of unused stock is retracted due to clockwise rotation of the cam roller when the unused stock is released by the tire builder.

When the belt is pulled forward by the tire builder, the circumference of the cam roller follows the belt stock 30 until the cam roller 40 rotates to the flat chordal portion 48, coming to rest with its forward edge 49 (nearest the tire builder) lightly loaded against the belt stock by virtue of the weight of the cam roller assembly including the pivot arms 28 and 28', bearing 38, cam shaft 36 and torque exerting means 50. The torque exerting means may be a conventional helical coil spring or a flexible tube having a preselected flex constant appropriately selected to provide a desired loading on the forward edge 49. Additional loading may be obtained if desired, by means of a spring biasing means (not shown) between one of the pivot arms 28 or 28' and the roller shaft 23.

It is a particularly noteworthy and unexpected advantage of this invention that the forward edge 49 is self-setting, that is, it tends to set itself with the forward edge 49 against the belt's upper surface acting as a cam against the belt. By 'edge' I refer to the intersection of the flat chordal portion (or 'flat') 48 with the circumferential surface of the cam roller 40. When the spacing between the flat and the primary feed rollers is properly adjusted, the forward edge 49 is self-setting. The spacing is properly adjusted when the distance between the flat and the surface of the primary rollers is slightly greater than the gauge (or thickness) of the belt stock. The distance is measured between the mid-point of the flat and the circumferential surface of the rollers on which the belt stock travels, and the distance is adjusted so that the edge 49 just holds the belt stock against the rollers. If the distance is too great the belt stock will slip out from between the edge and the primary rollers; if the distance is too small the cam roller will not retract the belt stock. When the distance is properly adjusted, the cam roller 40 correctly and repetitively provides the desired amount of retraction when the end of unused stock is released by the tire builder. At this self-setting position of the forward edge 49 as shown in FIG. 2, camming of the belt stock occurs between the edge and the primary rollers, that is, the belt stock is releasably held therebetween, allowing the belt stock to be pulled forward by the tire builder until a desired length is obtained; and the self-setting position is maintained as long as the belt stock is being pulled. In this embodiment, where the invention is used in tire building, a desired length of belt stock to be cut off is predetermined by the circumference of the carcass. The operator cuts the belt after one full rotation of the tire carcass around which the belt is wrapped, and the end of unused stock is retracted by spring actuation of the cam roller, on the discharge end of the feed tray.

The dimensions of the cam roller 40 which is provided with the flat chordal portion 48, are selected to provide a circumference of sufficient linear extent so that contact of the belt 'following' against the circumference will retract the belt through a maximum distance which corresponds to the length of the circumference. The circumference of the cam roller does not include the length of the chordal portion 48. The length of the chordal portion is chosen to allow the belt stock to slip between the forward edge 49 and the primary set of bi-directional rollers 21. This length is preferably in the range from about 10% to about 65% of the diameter of the cam roller, the precise length depending upon the overall size of the cam roller, the physical characteristics of the feed stock, the cross section of the feed stock, and the like. In this particular embodiment where the feed stock is metal cord reinforced belt stock for a tire, the cam roller is preferably in the range from about 4" to about 12" (inches) in diameter, and the length of the chord is in the range from about 30% to about 50% of the diameter, the smaller diameter generally corresponding to the larger percentage.

The cam roller 40, mounted on bearing 38 is disposed about the midpoint of the cam shaft 36 so that the circumferential surface of the cam roller provides an even fricitional force on either side of the longitudinal center line of the belt stock 30. The cam shaft 36 is inserted through torque-exerting means 50, here shown as a helical coil spring, one end of which is attached by screw 46 to the cam roller 40 at a point near its axial bore 41, so that a small preselected load is applied to the cam in a clockwise direction due to the tightening of the spring. The other end of the spring 50, which is a left-hand coil spring as used on the cam shaft 36 on the side shown, is anchored in a through-bore 37 in the cam shaft.

As indicated hereinbefore, end plate 24 is provided with an adjustable stop means 35, against which pivot arm 28 rests to adjust the distance between the axis of the cam shaft 36 and the axis of the roller shaft 23, so as to provide the proper spacing between the cam roller 40 and the bi-directional primary end set of feed rollers 21, as explained hereinbefore. The adjustable stop means is conveniently provided with a right angle bracket 52, one vertical arm 53 of which is slotted to provide a slot 54 which slidably accomodates a pair of Allen head machine screws 55 which when tightened hold the horizontal arm 56 at the desired height.

When the belt stock is cut, the cut portion, now a belt, is wrapped around the carcass of the tire, and the remaining unused stock portion is retracted because of the biasing force of the spring 50. This biasing force forces the cam roller surface to follow the belt stock. It will now be evident that there must be sufficient frictional force to engage the belt stock between the cam roller and the bi-directional rollers regardless of the extent of surface of any chosen feed stock presented to the cam roller and bi-directional rollers, or the cross section of such feed stock.

The set screw 44 in combination with the roller pin 45 prevents the cam roller from rotating in a clockwise direction beyond the desired retracted length. The predetermined distance through which the belt stock is to be retracted can be no greater than the length of the circumference of the cam roller 40. The belt feed stock may be retracted for a lesser distance than the length of the circumference of the cam roller by positioning set screw 44 and the set collar 43 so as to obstruct cam roller pin 45 which limits the counterclockwise rotation of the cam roller.

I claim:

1. An apparatus for presenting a feed stock of arbitrary length to an operator who manually pulls upon it, cuts off a predetermined portion and releases the remaining end portion of unused feed stock for retraction out of the zone of said operator's immediate subsequent operations, comprising, (a) a feeding surface upon which said feed stock rests, said feeding surface having a primary end and a discharge end, and upon which surface said feed stock is longitudinally translatable in either a forward or rearward direction, (b) cam roller means having
  (i) a circumference corresponding to a maximum distance through which said remaining end is to be withdrawn, and
  (ii) a flat chordal portion having a self-setting forward edge which rests against said feed stock supported near said primary end as said feed stock is pulled forward, (c) a cam shaft upon which said cam roller is rotatably disposed, (d) pivot arm means interconnected by said cam shaft, said pivot arm means being pivotably adjustable so as to provide a preselected spacing between said flat chordal portion and said feeding surface near its primary end, and, (e) torque exerting means to bias said cam roller when said feed stock is pulled forward, so that upon release of said remaining end portion it is retracted through a predetermined distance corresponding to a preselected portion of said cam roller's circumference.

2. The apparatus of claim 1 wherein said cam roller means includes rotation limiting means to limit said distance through which said remaining end portion of unused feed stock is withdrawn to less than said maximum distance.

3. The apparatus of claim 2 wherein said rotation limiting means includes an adjustable set collar movably disposed on said cam shaft, and set screw means in said set collar to stop rotational movement of said cam roller means when said remaining end portion is released.

4. The apparatus of claim 2 wherein said torque exerting means is a helical coil spring one end of which is secured in said cam shaft, and the other end is secured to said cam roller.

5. The apparatus of claim 2 wherein said feed stock is generally laminar stock for building a tire, and, said feeding surface comprises feed roller means in a tray of a tire servicer.

6. The apparatus of claim 5 wherein said pivot arm means are pivotably disposed on pivot means in end plates on said tray.

7. The apparatus of claim 5 wherein said feed roller means include bi-directional rollers rotatably disposed on plural roller shafts disposed intermediate side rails of said tray.

* * * * *